United States Patent [19]

Stump et al.

[11] Patent Number: 5,080,304
[45] Date of Patent: Jan. 14, 1992

[54] AIRCRAFT HOLD-DOWN DEVICE

[75] Inventors: Joseph W. Stump, Smithtown; Thomas J. Hunt, Centereach, both of N.Y.

[73] Assignee: Grumman Aerospace Corporation, Bethpage, N.Y.

[21] Appl. No.: 559,064

[22] Filed: Jul. 30, 1990

[51] Int. Cl.5 .......................... B64C 25/32; B64F 1/12
[52] U.S. Cl. .................... 244/115; 244/17.17; 244/100 R
[58] Field of Search ............. 244/115, 116, 110 R, 244/110 F, 114 R, 63, 17.17, 100 R

[56]     References Cited
     U.S. PATENT DOCUMENTS

| 2,403,456 | 7/1946 | Pitcairn | 244/115 |
| 3,075,731 | 1/1963 | Bennett et al. | 244/115 |
| 3,502,286 | 3/1970 | Warren | 244/115 |
| 4,890,802 | 1/1990 | Burgess et al. | 244/115 |

FOREIGN PATENT DOCUMENTS 1177751  1/1970  United Kingdom ............. 244/17.17

Primary Examiner—Joseph F. Peters, Jr.
Assistant Examiner—Anne E. Bidwell
Attorney, Agent, or Firm—Pollock, VandeSande & Priddy

[57]      ABSTRACT

An aircraft securement device includes a sliding shaft, typically mounted to the aircraft landing gear. The shaft resembles a harpoon and is lowered through a wire grid when deployed. Tab-like members spring outwardly from the lower shaft end and engage the lower surface of a grid so as to retain the aircraft thereto.

1 Claim, 1 Drawing Sheet

AIRCRAFT HOLD-DOWN DEVICE

FIELD OF THE INVENTION

The present invention relates to retaining devices, and more particularly to such devices for securing an aircraft to the ground.

BACKGROUND OF THE INVENTION

In the field and on board many types of ships, helicopters and VTOL aircraft must be safely secured when they are not deployed. Various types of hold-down devices have been used with varying degrees of satisfactory results. One of the problems with the prior art hold-down devices is the inability to quickly release an aircraft for deployment or for rolling the aircraft from one spot to another when it is on the ground.

In certain military situations, an aircraft is "crated" for shipment to a desired location. Various types of restraining devices are included within a storage container for ensuring that the aircraft remains secure. However, the restraining devices generally take quite a bit of time to release so as to limit the immediate deployment capability of the contained aircraft.

BRIEF DESCRIPTION OF THE INVENTION

The present invention is directed to a system which employs a grid upon which a non-deployed aircraft may be supported, or the grid might be incorporated as part of a shipment container for the aircraft. The aircraft incorporates vertically mounted harpoon-like devices which are displaced downwardly until a lower end passes through the grid; and spring-loaded tabs in the lower end pivot outwardly to securely hook the harpoon-like devices in place thereby securing an aircraft to the grid. The device of the present invention is quickly and easily inserted into a supporting grid thereby quickly securing an aircraft. Likewise, the device is quickly released so that the aircraft can be quickly deployed or moved. In the event the device of the present invention is incorporated in an aircraft shipping container, the ease and speed of securing an aircraft within the container results in a rapidly prepared aircraft (for shipping). At a delivery point the aircraft can be quickly removed from a container.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 2:
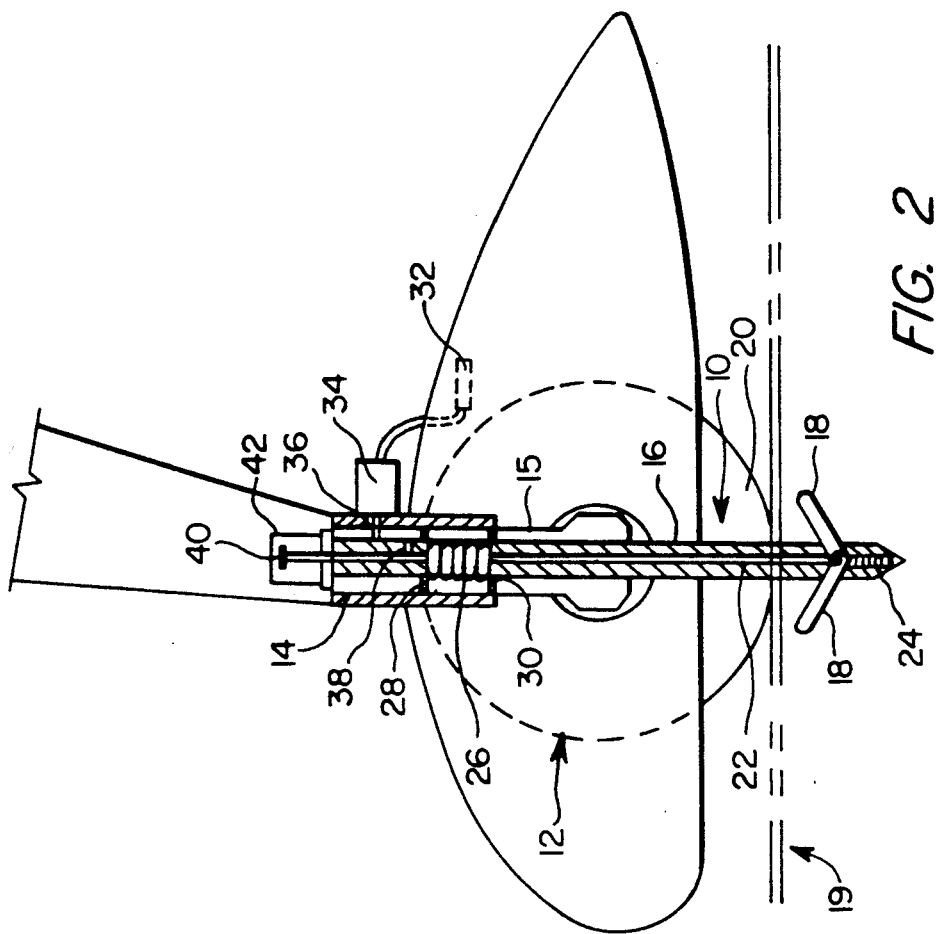
FIG. 2 is a side elevational view schematically depicting the system of the present invention.
Figure 1:
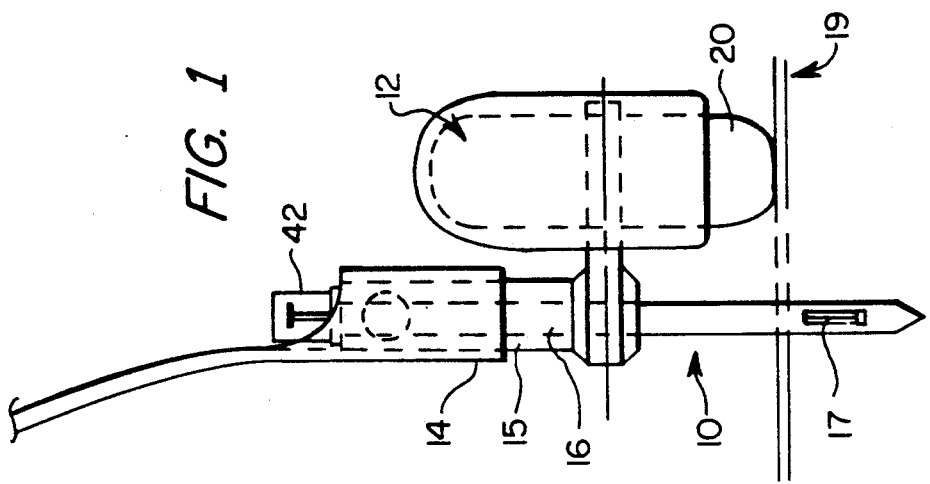
FIG. 1 is a front elevational view of an aircraft landing gear showing the installation of the present invention thereon.

The harpoon-like hook device of the present invention is generally indicated by reference numeral 10. In a preferred embodiment of the present invention, it is located adjacent a landing gear 12. The landing gear includes a vertically oriented tubular support 14 which supports a fixed journal 15, the latter receiving a vertically movable shaft 16. The lower end of shaft 16 is pointed and includes slots 17 formed therein (FIG. 1) for receiving pivotally displaceable tabs 18 (FIG. 2) which are normally biased outwardly. As the shaft lower end passes through a wire grid 19, the tabs yield momentarily until they clear the grid after which time they expand again. This effectively secures the landing gear 12 to the wire grid 19. Of course, when the shaft 16 is not deployed, the tabs 18 are retracted inwardly of the shaft 16; and the entire shaft is raised away from grid 19.

The mechanism for displacing the tabs 18 outwardly is a conventional mechanism, generally similar to umbrella opening mechanisms, and will now be briefly explained. An axial bore is formed through the length of shaft 16 to accommodate an actuating rod 22. The bottom of the rod is biased by coil spring 24 located at the lower end of the rod 22. The spring normally biases the tabs 18 outward but the tabs retract momentarily as they pass through grid 19.

In order to lower the entire shaft 16, a coil compression spring 26 is located along an upper length of shaft 16 and is restrained between upper and lower washers 28 and 30, respectively. These latter-mentioned washers are positioned within the journal 15. Normally, the shaft is retained in an upward position by a lock pin 36 which normally engages the hole 38 formed in the upper shaft. The pin 36 is solenoid actuated and the solenoid 34 is mounted to the tubular support 14. A conventional switch 32 senses when an aircraft sets down and a load is exerted on the landing gear. When this occurs, the solenoid 34 is actuated to retract pin 36 thereby permitting downward displacement of shaft 16. A handle 40 extends from the upper end of rod 22 to permit retraction of the tabs 18 while the mechanism is to be released from the grid 19. The handle 40 can have a simple pin (not shown) or other type of latch to selectively maintain the tabs in a retracted condition during flight as well.

An additional handle 42 extends coaxially over handle 40 and permits manual pulling of the shaft 16 to an initial retracted position. The handle 42 may have an opened top to provide access to handle 40.

Thus, as described, the present invention offers an aircraft securement device which is easily and quickly operated and which is structurally and mechanically reliable.

It should be understood that the invention is not limited to the exact details of construction shown and described herein for obvious modifications will occur to persons skilled in the art.

We claim:

1. An aircraft hold-down device comprising:

a journal;

a shaft slidably mounted in the journal;

spring means for normal biasing the shaft outwardly of the journal;

latching means for selectively retaining the shaft in a normally retracted position;

means for sensing when the aircraft has landed;

means for selectably releasing the latching means causing an outer end of the shaft to pass through a grill;

means for connecting the sensing means to the releasing means for deploying the shaft upon landing of an aircraft;

pivotally mounted tab members normally recessed within the shaft;

a rod slidably secured with the shaft and coaxial therewith, the rod being connected to the tab members for actuating their pivotal extensions thereby securing the shaft to the grill when the outer end of the shaft is passed therethrough; and means for mounting the journal to an aircraft landing gear.

* * * * *